Aug. 6, 1929.  O. V. KRUSE  1,723,736
VALVE
Filed May 24, 1921   2 Sheets-Sheet 1

Inventor
Otto V. Kruse
By his Attorneys

Aug. 6, 1929. O. V. KRUSE 1,723,736
VALVE
Filed May 24, 1921  2 Sheets-Sheet 2

Inventor
Otto V. Kruse
By his Attorney
Edwards, Sager & Bauer

Patented Aug. 6, 1929.

1,723,736

UNITED STATES PATENT OFFICE.

OTTO V. KRUSE, OF NARBERTH, PENNSYLVANIA, ASSIGNOR, BY MESNE ASSIGNMENTS, TO I. P. MORRIS CORPORATION, A CORPORATION OF DELAWARE.

VALVE.

Application filed May 24, 1921. Serial No. 472,037.

This invention relates to valves and particularly to valves for relatively large pipe lines in which, for instance, it is desirable to maintain efficient conditions of flow through the valve. The object of the invention is to provide such a valve which will operate as a stop valve or as a throttling valve for service in which the flow is normally in one direction only and as a check valve where reverse flow due to accidental or abnormal conditions is objectionable and to be prevented.

The use of the valve of this invention may be illustrated by an installation such as a valve in the discharge line from a centrifugal pump pumping water against pressure into a storage reservoir. In case the source of power driving the pump is accidentally cut off and the pump stops, reverse flow will occur, which it is desirable to prevent. It is preferable, of course, that the valve should close automatically without attention from the operator and that the characteristics of the closing stroke should be adjustable in order to prevent the possibility of the valve closing too rapidly and causing water hammer.

In the accompanying drawings

Fig. 2 is a sectional view of a modified detail of operating mechanism, and.

The valve shown in the drawings comprises a body 1 contracted at both ends and enclosing an internal cylinder 2 closed at one end and containing a plunger 3 which slides in the cylinder and seats in the neck of the body at 4 to stop the flow which is normally from left to right in the drawings. The internal cylinder 2 is spaced from the body by radial ribs 5 providing a fluid way 6 between the body and the internal cylinder, the flow being normally from left to right as indicated by the arrows. The plunger has an aperture 7 communicating between chamber 8 and the conduit, chamber 8 being formed by a conical partition 9 at the front end of the plunger.

Figure 1:
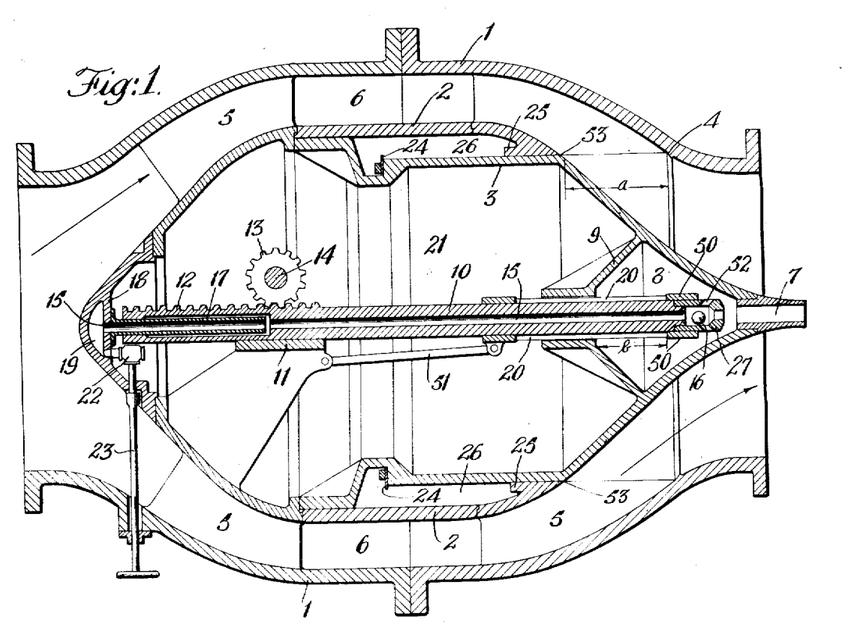
Fig. 1 is a vertical sectional view of a valve showing one specific embodiment of the invention.

The rod 10 controlling the flow through aperture 7 is hollow and has a close fit with sleeve 50 which in turn has a close fit with partition 9. The other end of rod 10 is supported by a bearing 11 and has teeth cut on one side to form a rack 12 which engages a pinion 13 on a shaft 14 which extends through the internal cylinder 2 and the body 1 and is operated by suitable mechanism located outside of the valve. The rod 10 has a passage 15 through it which is controlled at one end by a ball check 16 arranged to permit flow through 15 from right to left in the figure but to automatically stop flow in the opposite direction when rod 10 is seated against aperture 7. The central bore of rod 10 fits around a tube 17 connected to a partition 18 at the closed end of the internal cylinder. This arrangement provides a telescopic connection between passage 15 and chamber 19 at all positions of rod 10. Sleeve 50 is held stationary at all times by strut 51 which is fastened to bearing 11. Slots 20 are cut in sleeve 50 to provide a means of pressure communication between chamber 8 and chamber 21 formed between plunger 3 and internal cylinder 2. A stop valve or cock 22 is connected to chamber 19 and operated by an extension stem 23 from outside the valve body. Cock 22 serves as an adjustable means of pressure connection between chamber 19 and chamber 21. A flexible annular packing ring 24 is so attached to plunger 3 as to seat against a shoulder 25 when plunger 3 is seated at 4, thus preventing leakage from chamber 21 through chamber 26 to the fluid way 6.

In operation with flow in the normal direction from left to right the valve is closed by rotating pinion 13 counterclockwise and thus moving rod 10 toward its seat at aperture 7. This stops or diminishes the exhaust of pressure from chamber 21 through aperture 7 and inasmuch as the pressure admitted to chamber 21 from the fluid way through the clearance spaces between plunger 3 and internal cylinder 2 is higher than the pressure on the nose of the plunger, due to the direction and velocity of flow, the plunger 3 will move toward its seat 4 as long as rod 10 moves toward aperture 7. During the closing stroke of the plunger communication from chamber 21 to aperture 7 is established through slots 20 and passage 15 until the plunger moves the distance $b$ when slots 20 are cut off by partition 9 and communication for the remainder of the closing stroke is established by fluid flowing from chamber 21, through valve 22, chamber 19, passage 15, and to aperture 7. Ports 52 are provided so that ball check 16 will not cut off communication through passage 15 until plunger 3 reaches its seat 4 and rod 10 is seated against aperture 7. The motion of the plunger will stop substantially when the motion of rod 10 ceases because the plunger by moving slightly after rod 10 is stopped creates between aperture 7 and rod 10 an opening slightly larger than just previously existed therebetween. The larger opening allows a greater amount of fluid to flow from chamber 21 through valve 22 and passage 15 thereby to reduce the closing pressure in chamber 21 until all opposing forces are in equilibrium. Thus this valve may be operated at any position between wide open and fully closed. This permits regulating the quantity of discharge by throttling the flow. When plunger 3 seats at 4 rod 10 seats against aperture 7 and ball 16 seats at 27, thus stopping all flow through the valve in the normal direction.

Under normal conditions the plunger 3 is opened by rotating pinion 13 clockwise, drawing rod 10 away from aperture 7, thus permitting the escape of pressure from chamber 21 at first through valve 22, chamber 19, passage 15, ports 52 and aperture 7 and later in the opening stroke through slots 20 when these are uncovered by partition 9. When the pressure in chamber 21 is reduced sufficiently the pressure in chamber 26 communicated from fluid way 6 through the clearance around the plunger is operative to open the plunger but the motion of the plunger is co-ordinated to the motion of rod 10.

It is obvious that in both opening and closing the plunger the relation between rod 10 and aperture 7 is automatically adjusted to unbalance the opposing forces exerted on the plunger only enough to cause the plunger to move. If the motion of rod 10 is stopped at a point intermediate between the limits of the plunger stroke the plunger automatically comes to rest with aperture 7 in such relation to rod 10 that the opposing forces acting on the plunger are in a state of equilibrium and the plunger remains stationary.

If the valve is emptied or if there is no flow through the valve, plunger 3 is closed mechanically by rod 10 pushing against the plunger at aperture 7. If the velocity of flow through the valve is too low to create a difference of fluid pressure sufficient to close the plunger it will be assisted mechanically in the same manner as if there was no flow.

When the valve is open and flow taking place through it in the normal direction the parts will be in the position shown in Fig. 1. If under these conditions the flow reverses, the pressure in chamber 8 will immediately increase due to the reversed flow from right to left impinging upon aperture 7. This increased pressure will be communicated through slots 20 to chamber 21, where it will be exerted over the maximum cross sectional area of plunger 3. The opposing pressure in chamber 26 and against the nose of plunger 3 will be lower due to the velocity and direction of flow across the nose of the plunger and past the clearance space 53 which communicates pressure to chamber 26. The preponderance of pressure inside the plunger will thus act to close the plunger, rod 10 remaining stationary meanwhile.

If passage 15 should be omitted from rod 10 and flow from chamber 8 to chamber 21 permitted only through slots 20, the rate of closing could be controlled to a certain extent. In other words, plunger 3 would close only as fast as flow took place through slots 20 to fill the space in chamber 21 behind the plunger. It is usually desirable, however, to close the plunger through the greater part of its stroke at a relatively rapid rate and then slow it down for the remainder of the stroke. This is accomplished by cutting the slots 20 for only a limited distance $b$ beyond partition 9, this distance $b$ being less than the length $a$ of the plunger stroke, thus flow through slots 20 is cut off before plunger 3 reaches its seat. During the remainder of the stroke flow from chamber 8 to chamber 21 must occur through passage 15 and adjustable stop cock 22, and by manipulating the latter the rate of flow and consequently the rate of closing of the plunger may be varied at will. It is obvious that the characteristics of closing during the stroke $b$ may also be varied by tapering the slots 20 or in various other ways which affect the quantity of flow passing through these slots at various positions of the plunger 3. If it is desired to have the check valve feature operative at the wide open position of the plunger only grooves similar to slots 20 may be cut in rod 10, and sleeve 50 and strut 51 may be eliminated.

In case of reversed flow as when the forcing pump is accidentally stopped the valve automatically closes without any attention on the part of the operator and no matter in what position it is and irrespective of whether it is being opened or closed. The first part of the closing movement is relatively rapid. The last part of the closing stroke represented by the difference between $a$ and $b$ is slowed down to desired safe value as closure is approached so as to avoid any excessive rise in pressure in the system to the right of the valve. In closed position the packing washer 24 seats against shoulder 25 to prevent leakage. Upon re-establishment of normal conditions with higher pressure to the left of the valve the valve will automatically re-open to whatever position it was prior to automatic closure as pressure will build up by leakage into annular space 26 while chamber 21 communicates with the lower pressure at aperture 7 through passage 15 and ports 52. If automatic re-opening is undesirable after automatic closing has taken place it is only necessary to move rod 10 forward until it seats at aperture 7 before normal conditions are re-established. Then after higher pressure is established to the left of the valve the valve may be opened with controlled motion as previously described.

Figure 2:
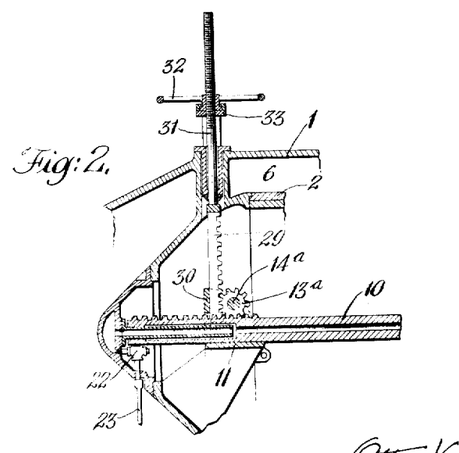

Fig. 2 shows a fragmentary cross section illustrating a modification of the mechanical means for operating rod 10. In this case the pinion 13ª instead of being attached to a shaft passing through the body of the valve is attached to a short shaft 14ª carried in fixed bearings on each side of the pinion 13ª which is made longer than pinion 13 of Fig. 1, and in addition to engaging rack 12, engages also a double rack 29 made in the form of a fork which straddles rack 12. Rack 29 is guided by a vertical bearing 30 on each side of a rack 12. Rack 29 has an extension stem 31 passing through the body of the valve and threaded at its outer end. A hand wheel 32 threaded to match stem 31 is held against axial movement by a retainnig ring or thrust bearing 33. By turning hand wheel 32 stem 31 and rack 29 are moved at right angles to rack 12. This motion is communicated to rack 12 through pinion 13ª which acts as an idler. This arrangement constitutes a simple means of operating rod 10.

Figure 3:
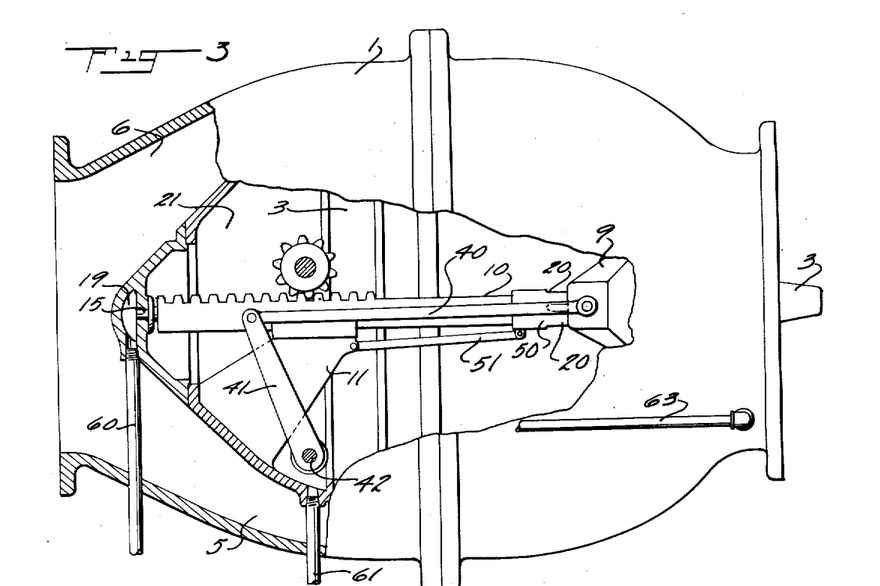
Figs. 3 and 4 are elevational views of a further modification with parts broken away to show the interior construction.
Figure 4:
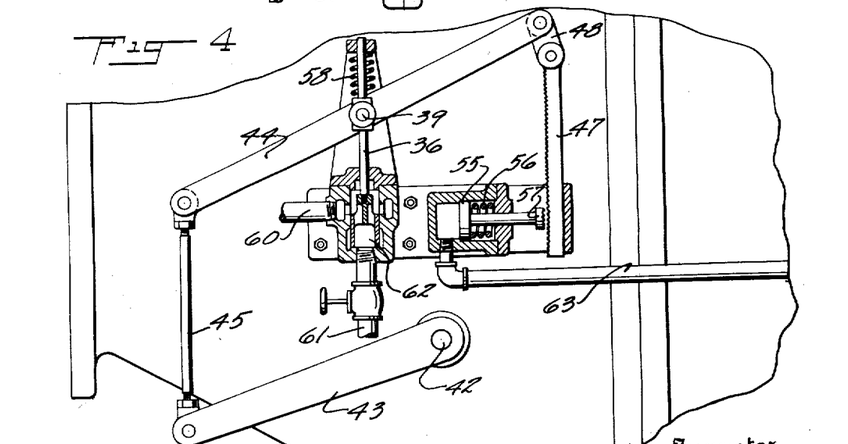

In the modification shown in Figs. 3 and 4 additional mechanism is provided for controlling the closing movement of the valve plunger according to the pressure conditions in the line beyond the valve seat. In many systems an automatic means of controlling the last part of the stroke actuated by the water hammer conditions in the piping beyond the valve is desirable. For example, in long pipe lines the rise of pressure established by restricting the flow may exist for a considerable time, in which case it may be desirable to actually stop the forward motion of the plunger until the pressure wave subsides and thus prevent additional rise of pressure. Also in pipe lines having branch connections where the conditions of flow are variable and where other features make the water hammer conditions considerably different at one time than another, any fixed adjustment of the check valve for the last part of its stroke might not adequately fulfill the requirements of operation. The purpose of the modified structure of Figs. 3 and 4 is to actually stop the closing stroke of the plunger should the pressure rise an appreciable amount beyond the desired limit. As soon as the pressure subsides the plunger will continue its closing stroke as formerly described.

To effect this control chamber 19 is connected to chamber 21 by pipes 60, 61 communicating through cylinder valve 62 which is closed by undue rise of pressure to shut off the supply of pressure to chamber 21 and stop the valve plunger until the pressure in the pipe line is reduced. To operate this valve 62 partition 9 transmits the plunger movement to outside the valve through link 40, lever 41, and shaft 42 extending through passage 6 to turn lever 43 clockwise as the plunger 3 closes. Link 45 therefore rocks the beam 44 clockwise during the closing movement of the plunger and thrusts the rack 47 downward by the link connection 48. Any excessive pressure in the pipe line transmitted through pipe 63 from some point to the right of seat 4 stops the movement of this rack by pressing piston 55 to the right against the pressure of spring 56 so as to bring pawl 57 into engagement with the teeth of rack 47 holding the right end of beam 44 against depression and causing the upward thrust of link 45 to raise the center of the beam 44. The center pivot of pin 39 of the beam thus lifts the rod 36 against the pressure of spring 58 and lifts valve 62 to shut off communication between pipes 60 and 61 and stop the flow of pressure to chamber 21. Valve 3 will therefore stop its closing movement until the subsiding of the pressure wave in the pipe line releases pawl 57 from rack 47 permitting the beam 44 to be depressed by spring 58 again opening valve 62 and allowing pressure to flow from chamber 19 through pipes 60, 61 to chamber 21. In case the valve 3 should tend to drift open due to leakage around the fit 53 of the plunger through chamber 26 to passage 6 lever 43 will move down, again opening communication through piston valve 62 sufficiently to hold the valve plunger 3 stationary.

The operation of the valve plunger with this control in action will be intermittent in that it will close until the rise of pressure becomes excessive, at which point it will stop and then will continue closing when the rise of pressure has subsided.

I claim:

1. In a valve the combination with a conduit having a tapering contraction of a conical valve plunger forming a smooth fluid way with said tapering contraction and adapted to seat against the surface of said contraction to close said conduit, and means for moving said valve comprising fluid pressure connections wholly within the conduit for automaticlly closing said valve upon reversal of flow in said conduit.

2. In a valve the combination with a conduit having a tapering contraction, of a valve plunger forming a smooth fluid way with said tapering contraction and adapted to seat against the surface of said contraction to close said conduit, and means for moving said plunger including a fluid pressure connection wholly within the conduit for automatically closing said valve upon reversal of flow in said conduit, and valve means for controlling fluid flow to said plunger moving means being operative automatically during plunger movement.

3. In a valve the combination with a conduit having a smooth fluid way, of a valve plunger cooperating therewith to form said fluid way, a seat carried by said conduit against which the plunger closes, means for closing said valve automatically upon reversal of flow in said conduit including a piston and cylinder, means for always subjecting an inner portion of said cylinder to fluid pressure, and means for controlling fluid pressure in another inner portion of said cylinder, said latter means having a passage communicating with said conduit whereby a reversal of normal flow may create an increased pressure in said passage to thereby effect closure of the plunger.

4. In a valve the combination with a conduit having a seat, of a valve plunger forming a smooth fluid way with said conduit and adapted to engage said seat, and means for closing said valve automatically upon reversal of flow in said conduit including piston and cylinder elements, means for subjecting one portion of said cylinder to fluid pressure for effecting movement of the valve plunger in one direction, a passage for allowing communication between another portion of said cylinder and said conduit, said latter means including means for automatically throttling fluid flow from the conduit to said other cylinder portion when reverse flow in said conduit occurs, thereby controlling the rate of plunger movement substantially irrespective of the rate of reverse flow velocity in said conduit.

5. In a valve the combination with a conduit having a tapering contraction, of a conical valve plunger forming a smooth fluid way with said tapering contraction and adapted to seat against the surface of said contraction to close said conduit, and means for moving said valve and holding it at various degrees of opening comprising a fluid way connection through the valve plunger for automatically admitting pressure to close said valve upon reversal of flow in said conduit.

6. In a valve the combination with a conduit having a tapering contraction, of a conical valve plunger forming a smooth fluid way with said tapering contraction and adapted to seat against the surface of said contraction to close said conduit, and combined mechanically and fluid pressure operated means for moving said valve and holding it at various degrees of opening comprising fluid pressure operated means for automatically closing said valve upon reversal of flow in said conduit.

7. In a valve the combination with a conduit having a tapering contraction, of a conical valve plunger forming a smooth fluid way with said tapering contraction and adapted to seat against the surface of said contraction to close said conduit, and means for moving said valve comprising means for automatically closing said valve at a decreasing rate upon reversal of flow in said conduit.

8. In a valve the combination with a conduit having a tapering costraction, of a conical valve plunger forming a smooth fluid way with said tapering contraction and adapted to seat against the surface of said contraction to close said conduit, and means for moving said valve comprising means for automatically closing said valve upon reversal of flow in said conduit and automatically retarding the end of the closing movement.

9. In a valve the combination with a conduit having a tapering contraction, of a conical valve plunger forming a smooth fluid way with said tapering contraction and adapted to seat against the surface of said contraction to close said conduit, means for opening said valve by fluid pressure in said conduit in one direction of fluid flow and automatically closing said valve in accordance with fluid pressure in said conduit when fluid flow is in the opposite direction, said means comprising a plurality of fluid pressure chambers with a piston element therein, and means for varying the pressure in one of said chambers automatically in accordance with fluid pressure in said conduit, thereby to effect one of said automatic operations.

10. In a valve the combination with a conduit having a tapering contraction, of a conical valve plunger forming a smooth fluid way with said tapering contraction and adapted to seat against the surface of said contraction to close said conduit, and means for opening said valve by fluid pressure in said conduit in one direction and automatically closing said valve by fluid pressure in said conduit in the opposite direction comprising a plurality of fluid pressure chambers within said valve and means for automatically varying the pressure in one of said chambers.

11. In a valve the combination with a conduit having a tapering contraction, of a conical valve plunger forming a smooth fluid way with said tapering contraction and adapted to seat against the surface of said contraction to close said conduit, and means for opening said valve by fluid pressure in said conduit in one direction and automatically closing said valve at a variable rate decreasing toward the closing position by fluid pressure in said conduit in the opposite direction.

12. In a valve the combination with a conduit having a tapering contraction, of a conical valve plunger forming a smooth fluid way with said tapering contraction and adapted to seat against the surface of said contraction to close said conduit, and means for moving the valve mechanically and automatically closing said valve by a reversal of flow irrespective of the position of said mechanical means comprising a fluid passage from the conduit to the interior of the valve.

13. In a valve the combination with a conduit having a tapering contraction, of a conical valve plunger forming a smooth fluid way with said tapering contraction and adapted to seat against the surface of said contraction to close said conduit, and means for moving the valve mechanically and automatically closing said valve by a reversal of flow irrespective of the position of said mechanical means comprising a fluid passage from the contracted neck of said conduit to the interior of the valve.

14. In a valve the combination with a conduit having a tapering contraction, of a conical valve plunger forming a smooth fluid way with said tapering contraction and adapted to seat against the surface of said contraction to close said conduit, means for moving said valve comprising a passage forming a connection between the interior of the valve and the fluid way in said conduit, said passage being so disposed as to increase the closing pressure on said valve upon reversal of the flow, and means controlling said closing pressure by the movement of said valve plunger toward closed position.

15. In a valve the combination with a conduit, of a cylindrical body therein, a valve plunger sliding in said body to seat against a portion of said conduit, means for moving said valve comprising a differential piston and means for automatically closing said valve upon reversal of the flow comprising connections to the fluid way through said conduit adapted to bring a closing pressure to bear on said piston.

16. In a valve the combination with a conduit, of a cylindrical body in said conduit carrying a sliding valve plunger having an aperture communicating with the fluid way through said conduit, a slidable rod controlling said aperture and having passages controlling the communications between said aperture and the interior of the valve by the relative movement between the valve and the rod so as to automatically decelerate the closing movement of the valve.

17. In a valve the combination with a valve plunger and a fluid operated means therefor, including a plurality of fluid chambers and a piston therebetween, of means for actuating said fluid operated means to close automatically the valve whenever the flow is reversed in said conduit, comprising means to throttle the fluid flowing to one of said chambers automatically when said plunger approaches its closed position, thereby to control the rate of movement of the valve plunger.

18. In a valve having inner and outer casings spaced to form a smooth fluid passageway therebetween, a valve plunger, telescopically arranged to connect with said inner casing and having a plurality of fluid chambers forming fluid operated means, and means for actuating said fluid operated means to automatically close the valve whenever the flow is reversed, comprising means to automatically vary the closing pressure in one of said chambers.

19. In a valve the combination with a valve plunger having a plurality of fluid chambers forming fluid operated means to move it, of means for actuating said fluid operated means to close automatically the valve whenever the flow is reversed comprising means to control automatically the pressure in one of said chambers, thereby to permit only a predetermined rate of plunger valve movement substantially irrespective of the rate of flow velocity through said conduit.

20. In a valve having inner and outer casings spaced to form a smooth fluid passageway therebetween, a valve plunger telescopically arranged to connect with said inner casing and having a plurality of fluid chambers forming fluid operated means to move it, and means for actuating said fluid operated means to automatically close the valve comprising means to automatically vary the closing pressure in one of said chambers whenever the flow is reversed.

21. In a valve having inner and outer casings spaced to form a smooth fluid passageway therebetween, a valve plunger telescopically arranged to connect with said inner casing having fluid operated means to move it, and means for actuating said fluid operated means to automatically close the valve whenever the flow is reversed, comprising means for automatically decelerating the end of the closing movement.

22. In a valve the combination with a valve plunger having fluid operated means to move it, of means for actuating said fluid operated means to automatically close the valve whenever the flow is reversed, comprising means for automatically decelerating the end of the closing movement, and means for varying the rate of said deceleration.

23. In a valve the combination with a valve plunger having fluid operated means to move it, of means for actuating said fluid operated means to automatically close the valve upon reversal of the flow, comprising means for automatically decelerating the end of the closing movement, and means for adjusting the rate of said deceleration from outside of said valve.

24. The combination with a conduit having a valve seat, of a valve plunger for closing said conduit, and means for automatically moving said plunger whenever the flow is reversed comprising automatically movable valve means for controlling the movement of said plunger by the pressure conditions in said conduit and means whereby a difference in fluid pressure forces initiates valve movement.

25. The combination with a conduit having a valve seat, of a valve plunger for closing said conduit, and means for automatically moving said plunger upon reversal of flow comprising means for retarding the movement of said plunger by a rise of pressure in said conduit.

26. The combination with a conduit having a valve seat, of a valve plunger for closing said conduit, means for closing the valve with flow in either direction, and automatically movable valve means for automatically controlling the rate of the closing movement according to the conditions in the conduit.

27. The combination with a conduit having a valve seat, of a valve plunger for closing said conduit, means for automatically closing the valve upon any reversal of flow, a piston chamber acting as a dashpot to limit the rate of closing of the valve, and automatically adjustable means for automatically checking the closing movement of the plunger according to pressure rises whereby closure of said valve as it approaches its seat is so regulated that at least a predetermined time interval is required to effect complete closure.

28. The combination with a conduit having a tapering portion and a valve seat, of a valve plunger for closing said conduit, a chamber in which fluid pressure exerts a force on said valve in a closing direction, said chamber having a fluid connection with the downstream side of said conduit, hand controlled means for moving said valve plunger having one position to close the plunger and another position to open the plunger, and means including said closing chamber for automatically closing the plunger upon the occurrence of predetermined conditions of flow in the conduit irrespective of the position of said hand controlled means.

29. The combination with a conduit having a tapering portion and a valve seat, of a valve plunger for closing said conduit, a fluid pressure chamber for controlling closing of said valve, hand controlled means for moving said valve plunger having one position to close the plunger and another position to open the plunger, and means including said chamber for automatically closing the plunger upon reversal of the flow in the conduit irrespective of the position of said hand controlled means.

30. The combination with a conduit having a tapering portion and a valve seat, of a valve plunger for closing said conduit, hand controlled power operated means for moving said valve plunger having one position to close the plunger and another position to open the plunger, and means for automatically closing the plunger upon the occurrence of predetermined conditions of flow in the conduit irrespective of the position of said hand controlled means, comprising means for varying the rate of the closing movement of the plunger by directly controlling the power supply to said valve moving means.

31. The combination with a conduit having a tapering portion and a valve seat, of a valve plunger for closing said conduit, hand controlled means for moving said valve plunger having one position to close the plunger and another position to open the plunger, and means for automatically closing the plunger upon the occurrence of predetermined conditions of flow in the conduit irrespective of the position of said hand controlled means, comprising means adapted to prevent closure of said valve within a predetermined time limit and which is brought into operation according to the flow conditions in the conduit.

32. The combination with a conduit having a tapering portion and a valve seat, of a valve plunger for closing said conduit, hand controlled means for moving said valve plunger having one position to close the plunger and another position to open the plunger, and means for automatically closing the plunger upon reversal of the flow in the conduit irrespective of the position of said hand controlled means comprising means for varying the rate of the closing movement of the plunger.

33. The combination with a conduit having a tapering portion and a valve seat, of a valve plunger for closing said conduit, hand controlled means for moving said valve plunger having one position to close the plunger and another position to open the plunger, and means for automatically closing the plunger upon reversal of the flow in the conduit irrespective of the position of said hand controlled means comprising means for varying the rate of the closing movement of the plunger according to the flow conditions in the conduit.

34. The combination with a conduit having a tapering portion and a valve seat, a casing disposed within said conduit and spaced therefrom to form a smooth fluid passageway, of a valve plunger for closing said conduit and having telescopic relation with said inner casing, means for mechanically moving said valve plunger, and fluid pressure operated means for automatically closing said plunger upon occurrence of predetermined conditions of flow in the conduit comprising means for automatically varying the rate of closing movement of the plunger to decelerate movement of the plunger as its seat is approached.

35. The combination with a conduit having a tapering portion and a valve seat of a valve plunger for closing said conduit, means for mechanically moving said valve plunger, and fluid pressure operated means for automatically closing said plunger upon occurrence of predetermined conditions of flow in the conduit comprising means adapted automatically to prevent closure of said valve within a predetermined time limit when said valve approaches its seat, said automatic means being brought into operation according to the flow conditions in the conduit 36. The combination with a conduit having a tapering portion and a valve seat, of a hollow valve plunger for closing said conduit, said hollow portion being adapted to receive fluid pressure which exerts pressure on said plunger in a closing direction, hand controlled means for closing said valve plunger, and means for automatically continuing the closing movement of said plunger whenever the flow is reversed in said conduit.

37. The combination with a conduit having a tapering portion and a valve seat, of a valve plunger for closing said conduit including a closing chamber, hand controlled means for closing said valve plunger by fluid pressure in said chamber, and means for automatically continuing the closing movement of said plunger by the fluid pressure in said chamber upon reversal of flow in said conduit comprising means for automatically effecting a predetermined rate of closing movement of the plunger.

38. The combination with a conduit having a tapering portion and a valve seat, of a valve plunger for closing said conduit, hand controlled means for closing said valve plunger, and means for automatically taking control from said hand means and continuing the closing movement of said plunger upon reversal of flow in said conduit comprising means adapted automatically to prevent closing of said valve within a predetermined time limit when said valve approaches its seat, said automatic means being brought into operation according to a pressure rise in the conduit.

39. The combination with a conduit having a valve seat, of a valve plunger for closing said conduit, a fluid pressure chamber for controlling closing of said valve, and means including said chamber for automatically closing the valve from any position upon reversal of flow and automatically returning the valve to its former open position upon reestablishment of normal conditions in the conduit.

40. The combination with a conduit having a valve seat, of a plunger movable against said seat to close said conduit, means for moving said plunger to intermediate positions to throttle the flow through said conduit, and means for automatically moving said plunger in a closing direction from any position whenever the flow is reversed comprising means for retarding the movement of the valve at positions nearing closure.

41. The combination with a conduit having a valve seat, of a plunger movable against said seat to close said conduit, means for moving said plunger to intermediate positions to throttle the flow through said conduit, and means for automatically moving said plunger to its closing position from any position whenever the flow is reversed comprising means for retarding the movement of the valve at positions nearing closure according to the pressure conditions in the conduit.

42. The combination with a conduit having a valve seat, of a valve plunger adapted to move against said seat to control the flow through said conduit, means for moving said plunger towards said seat under hand control, means for automatically taking control from said hand means and closing said plunger against said seat whenever the flow is reversed, and means for automatically retarding the closing movement of the valve when near said seat.

43. The combination with a conduit having a valve seat, a hollow casing disposed within said conduit and spaced therefrom to form a smooth fluid passageway therewith, a valve plunger having telescopic relation with said casing and adapted to move against said seat to control the flow through said conduit, of means for moving said valve towards said seat under hand control, means for automatically taking control from said hand means and closing said valve against said seat whenever the flow is reversed, and means for automatically retarding the closing movement of the valve when near said seat according to the conditions in the conduit.

44. The combination with a conduit having a valve seat, of a valve plunger adapted to move against said seat, an opening between the interior of said plunger and said conduit, hand controlled means for adjusting said opening to control the position of the valve with flow in one direction, and automatic means for controlling the movement of the valve upon reversal of the flow comprising means for retarding the movement of the valve near its seat.

45. The combination with a conduit having a valve seat, of a valve plunger adapted to move against said seat, an opening between the interior of said plunger and said conduit, hand controlled means for adjusting said opening to control the position of the valve with flow in one direction, and automatic means for controlling the movement of the valve upon reversal of the flow comprising means for retarding the movement of the valve near its seat according to the conditions in the conduit.

46. In a flow control system the combination with an outer conduit casing, of an inner fixed member carrying a hollow slidable plunger seating against said casing, a partition providing a chamber in the front of said plunger, a rear opening through said partition, valve means controlling said opening, and a valve controlled exhaust connection from said chamber.

47. In a flow control system the combination with an outer conduit casing, of an inner fixed member carrying a hollow slidable plunger seating against said casing, a partition providing a chamber in the front of said plunger, a rear opening through said partition, valve means controlling said opening, to close said opening in closed position of the plunger, and a valve controlled exhaust connection from said chamber.

48. In a flow control system the combination with an outer conduit casing, of an inner fixed member carrying a hollow slidable plunger seating against said casing, said fixed member and plunger being shaped to form a cylindrical chamber and an annular chamber, a partition providing a chamber in the front of said plunger, a rear opening through said partition, valve means controlling said opening, and a valve controlled exhaust connection from said chamber.

49. The combination with a valve mechanism having a movable plunger valve and fluid pressure means for actuating the same, of means for positioning said plunger valve in any one of a plurality of substantially set positions, including ported fluid control means adapted when moved to and held in a given position to effect a set intermediate plunger position substantially irrespective of pressure fluctuations, and means whereby relative movement between said ported means and plunger may be had.

50. The combination with a valve mechanism having a movable plunger valve and fluid pressure means for actuating the same, of means for positioning said plunger valve in any one of a plurality of substantially set positions, including ported fluid control means adapted to have substantially the same degree of port opening for any of said positions, and means for effecting relative movement between the same and said plunger, whereby a different positioned port opening may be had, each port position corresponding to that desired set position of the plunger valve.

51. The combination with a valve mechanism having a movable plunger valve and fluid operating means for actuating the same, of means for effecting any one of a plurality of different positions of the plunger, including ported fluid control means, means for effecting relative movement between the latter and said plunger, and means whereby a different positioned port opening may be had, which different position corresponds to a new position of the plunger, and means whereby at each new position of port opening the same degree of port opening may be had.

52. The combination with a valve having a plunger and fluid operated means for actuating the same, of means for positioning the plunger, including a ported member movable relative to the plunger and adapted during intermediate movements to have substantially the same degree of port opening, and means whereby said ported member when moved to a different position will permit the plunger valve to move to a corresponding position.

53. The combination with a conduit valve having a ported plunger and fluid operated means for actuating the same including an opening chamber closed off from the fluid way of said conduit to form a chamber separate therefrom, of a movable ported member for controlling the position of said plunger and adapted to have communication with the valve conduit, the ported member being adapted to close the plunger port.

54. The combination with a valve having a movable plunger and fluid operated means for actuating the same, of a movable ported member separate from said plunger and movable to different set positions whereby a corresponding position of the plunger is assumed, said member during positioning of the plunger in any position being adapted to have the same degree of port opening.

55. The combination with a valve having a movable hollow plunger and fluid operated means for actuating the same including an opening chamber closed off from the fluid way of said conduit to form a chamber separate therefrom, of a longitudinally movable member having an interior passage, one end of which communicates with the front end of the hollow plunger, while the other end communicates with the rear portion thereof.

56. The combination with a valve having a movabale hollow plunger provided with a plurality of chambers and fluid operated means for actuating said plunger, of a longitudinally movable member having a passage, one end of which communicates with one chamber and the other end of which communicates with the other chamber whereby fluid may flow from one chamber to the other, and means associated with said passage whereby fluid flow therethrough is automatically restricted in accordance with operating conditions.

57. The combination with a valve mechanism having a valve plunger and fluid operated piston and cylinder elements for actuating the same, of a ported member movable relative to and axially of said piston element, whereby different substantially fixed positions of said plunger may be had for different positions which the ports of said ported member will assume upon adjustment of the latter.

58. The combination with a valve mechanism having a valve plunger and fluid operated piston and cylinder elements for actuating the same, of a ported member movable relative to and axially of said piston element, whereby different substantially fixed positions of said plunger may be had for different positions which the ports of said ported member will assume upon adjustment of the latter, and manual means for effecting different adjusted positions of said ported member.

59. A valve mechanism comprising a hollow plunger having a nosepiece and a partition adjacent said nose to form a chamber therein of substantial volume, means forming a fluid passage connection between said chamber and the interior of said plunger, and means for automatically restricting fluid flow between said chamber and plunger interior when the plunger has moved a predetermined distance.

60. The combination with a conduit, of a valve mechanism having an outer casing and a plunger adapted to cooperate therewith to control fluid flow through said conduit, fluid operated means for actuating said plunger, including a passage having substantially free communication with the downstream side of said conduit for a predetermined movement of the plunger whereby actuating fluid pressure may be supplied from said conduit for effecting said movement, and means separate from said outer casing for automatically restricting fluid flow from the downstream side of said conduit to said operating means upon completion of said predetermined plunger movement.

61. The combination with a conduit, of a valve mechanism having a plunger, fluid operated means for actuating the same, including a passage having substantially free communication with said conduit for a predetermined movement of the plunger, means for automatically restricting fluid flow from said conduit to said operating means upon completion of said predetermined plunger movement, and other passages rendered operative upon occurrence of said automatic restriction and including an adjustable throttle valve permitting restricted fluid flow relative to said operating means.

62. The combination with a hydraulic conduit through which liquid normally flows in one direction, of a valve, liquid actuated means for moving said valve, means whereby when reverse flow occurs said valve is automatically closed by liquid pressure which is generated by the velocity head of the reverse flow, and liquid means for controlling the rate of closing movement.

63. The combination with a hydraulic conduit through which liquid normally flows in one direction, of a valve, liquid actuated means for moving said valve, means whereby when reverse flow occurs said valve is automatically closed by the conduit liquid pressure which is generated by the velocity head of the reverse flow and means whereby said valve will close only at a substantially predetermined rate substantially irrespective of the rate of flow velocity.

64. A valve mechanism comprising inner and outer casings spaced to form a fluid passage therebetween, a plunger having telescopic relation with said inner casing to form an internal fluid chamber, an orifice in the nose of said plunger, a partition carried on the inside of said nose, and having an opening, a sleeve-like member extending through said partition opening, a fluid passage disposed between said partition and sleeve-like member permitting communication between said orifice and internal chamber, said sleeve having a cylindrical portion adapted to slide within said partition opening thereby to restrict the communication between said orifice and internal chamber, a pilot valve slidably disposed within said sleeve-like member and having an internal passage, said pilot valve being adapted to cooperate with said orifice to control fluid flow therethrough, and a fluid connection between the upstream end of said internal passage and said internal chamber.

65. In a flow control system the combination with an outer casing for a conduit, of an inner hollow cylindrical member in fixed position with relation to said casing, a plunger element slidably mounted with relation to said fixed member and having an end portion seating against said conduit casing, the fixed member and plunger being formed to provide a central chamber and an annular chamber, partition means forming a separate chamber at one portion of said plunger, a longitudinally movable member having a valve at one end controlling a connection to said separate chamber to vary the fluid pressure on said plunger, and means at the other end of said longitudinally movable member for controlling a fluid pressure connection to the interior of said fixed member.

OTTO V. KRUSE.

CERTIFICATE OF CORRECTION.

Patent No. 1,723,736.

Granted August 6, 1929, to

OTTO V. KRUSE.

It is hereby certified that error appears in the printed specification of the above numbered patent requiring correction as follows: Page 4, line 89, claim 8, for the misspelled word "costraction" read "contraction"; page 5, strike out lines 105 to 115, comprising claim 20; and that the said Letters Patent should be read with these corrections therein that the same may conform to the record of the case in the Patent Office.

Signed and sealed this 12th day of November, A. D. 1929.

(Seal)

M. J. Moore,
Acting Commissioner of Patents.

to said fixed member and having an end portion seating against said conduit casing, the fixed member and plunger being formed to provide a central chamber and an annular chamber, partition means forming a separate chamber at one portion of said plunger, a longitudinally movable member having a valve at one end controlling a connection to said separate chamber to vary the fluid pressure on said plunger, and means at the other end of said longitudinally movable member for controlling a fluid pressure connection to the interior of said fixed member.

OTTO V. KRUSE.

CERTIFICATE OF CORRECTION.

Patent No. 1,723,736.

Granted August 6, 1929, to

OTTO V. KRUSE.

It is hereby certified that error appears in the printed specification of the above numbered patent requiring correction as follows: Page 4, line 89, claim 8, for the misspelled word "costraction" read "contraction"; page 5, strike out lines 105 to 115, comprising claim 20; and that the said Letters Patent should be read with these corrections therein that the same may conform to the record of the case in the Patent Office.

Signed and sealed this 12th day of November, A. D. 1929.

(Seal)

M. J. Moore,
Acting Commissioner of Patents.